United States Patent [19]

Bernhardt

[11] Patent Number: 5,143,606
[45] Date of Patent: Sep. 1, 1992

[54] ARRANGEMENT FOR CLEANING CONTAMINATED GROUND WATER

[75] Inventor: Bruno Bernhardt, Reutlingen, Fed. Rep. of Germany

[73] Assignee: IEG Industrie-Engineering GmbH, Reutlingen, Fed. Rep. of Germany

[21] Appl. No.: 797,427

[22] Filed: Nov. 22, 1991

[30] Foreign Application Priority Data

Nov. 22, 1990 [DE] Fed. Rep. of Germany ....... 4037059

[51] Int. Cl.$^5$ .................... B01D 19/00; C02F 1/20
[52] U.S. Cl. .................... 210/170; 210/188; 210/196; 210/218; 210/901; 166/74; 166/242; 166/278; 166/311; 55/190; 55/196; 261/77
[58] Field of Search ............... 210/170, 188, 196, 218, 210/195.1, 202, 220, 221.2, 258, 747, 901, 151; 166/74, 242, 278, 311; 55/189, 190, 196; 261/77, 122

[56] References Cited

U.S. PATENT DOCUMENTS

| | | | |
|---|---|---|---|
| 4,478,765 | 10/1984 | Tubbs .................... | 210/170 |
| 4,543,186 | 9/1985 | Weisenberger et al. ............ | 210/170 |
| 4,582,610 | 4/1986 | Barker .................... | 210/170 |
| 4,765,902 | 8/1988 | Ely et al. .................... | 210/901 |
| 4,883,589 | 11/1989 | Konon .................... | 210/170 |
| 4,950,394 | 8/1990 | Bernhardt et al. ................ | 210/170 |
| 4,992,174 | 2/1991 | Caplan et al. .................... | 210/170 |

FOREIGN PATENT DOCUMENTS

3625488 10/1987 Fed. Rep. of Germany .

Primary Examiner—Stanley S. Silverman
Assistant Examiner—Christopher Upton
Attorney, Agent, or Firm—Michael J. Striker

[57] ABSTRACT

An arrangement for cleaning contaminated ground water and a ground region through which it flows, comprises a shaft extending to a region of the ground water to be cleaned and having water permeable shaft walls separated from one another by a separating wall and adapted for aspirating of water from a ground region and reintroducing of the water into the ground region, elements for circulating water and including a water circulating pump and a passage extending through the separating wall and forming a part of a flow path, a shaft insert formed so that the passage is a part of the shaft insert. The shaft insert has a gas chamber through which a gas is supplied under the action of negative pressure. The water circulating pump is formed as a suction pump arranged on the shaft insert in a water aspiration region of the shaft. A water receiving chamber starts underneath the gas chamber and extends above the gas chamber.

20 Claims, 5 Drawing Sheets

ARRANGEMENT FOR CLEANING CONTAMINATED GROUND WATER

BACKGROUND OF THE INVENTION

The present invention relates to an arrangement for cleaning contaminated ground water and a ground region through which it flows.

More particularly, it relates to such an arrangement which has a shaft extending to the region of ground water to be cleaned with a plurality of water permeable shaft walls separated from one another by a partition located under the ground water level so as to aspirate water from the ground region and again supply the water into the ground region, and also having a passage which extends through the separating wall and forms a part of a flow path, with a water circulating pump and a filter connected with the passage.

The arrangement of the above discussed general type is discussed for example in the German patent application P 39 31 012.4 of the applicant. This arrangement can be further improved.

SUMMARY OF THE INVENTION

Accordingly, it is an object of the present invention to provide an arrangement of the above mentioned general type, which is a further improvement of the known arrangement of this type.

In keeping with these objects and with others which will become apparent hereinafter, one feature of the present invention resides, briefly stated, in an arrangement for cleaning contaminated ground water in which the passage extending through the separating wall has a shaft insert provided with a gas chamber which is limited by a nozzle body arranged under a water level in the region of the shaft insert, so that a gas such as for example fresh air is supplied in the gas chamber during generation of a negative pressure above the water level, and the circulating pump operates as a suction pump in the water aspiration region of the shaft at the shaft insert and supplies the gas into a water receiving chamber which starts underneath the gas chamber and extends out of the region above the gas chamber.

The arrangement designed in accordance with the present invention combines the features of the arrangements proposed in the patent application P 39 31 012.4 and in the older German document DE-OS 36 25 488. It provides the advantage that the cleaning arrangement is located in easily accessible upper well shaft region practically independent from the position of the ground water level in the ground, and the ground water cleaning is performed both by a negative pressure treatment and also by a filter cleaning. With this arrangement not only volatile impurities in gaseous state can be removed, but also the impurities which are dissolved in the ground water can be removed as well. The location of the cleaning arrangement in the upper well region is especially advantageous for servicing of the filter.

The shaft insert can be formed preferably as a hollow cylinder which opens upwardly and is provided downwardly with at least one ground water inlet opening, wherein the gas chamber with the nozzle body and the water receiving chamber can be arranged or formed inside the hollow cylinder. In the hollow cylinder additionally the suction pump can be arranged as well. The shaft insert can support at least partially the filter for the ground water cleaning. Therefore together with the shaft insert which is advantageously arranged in the shaft in a vertically adjustable manner, all important parts can be removed from the upper shaft and for service and exchange. The filter can be exchangeably arranged axially under the hollow cylinder of the shaft insert or radially outside of the hollow cylinder of the shaft insert.

The exchangeable filter can be advantageously limited by flexible sieve walls which are supported relative to one another by at least one spiral shaped reinforcing element. This construction permits the utilization of simple structural elements. The intermediate chamber between the flexible sieve walls can be filled with any filtering mass, for example filtering granulate to adjust to specific impurities to be filtered out. The filter walls can be advantageously composed of flexible conventional sieve fabrics which are used for different applications depending on the mesh size. The filter body or its sieve walls can be arranged concentrically to at least one filter body of the shaft insert and therefore provide an additional support or guidance.

As mentioned hereinabove, the shaft insert, and especially the hollow cylinder provided in the shaft insert, can be located above the ground water level formed in the shaft and connected with a water aspiration region of the shaft by the pipe extending through the separating wall. The shaft insert can be, however, also arranged completely inside the ground water region when the ground water level is high. The location of the vertically adjustable shaft insert can be, however, selected so that the re-introducing region of the shaft located above the separating wall is limited by a permeable shaft well region which extends upwardly up to the area above the ground water level in the shaft into the water free shaft area under negative pressure. In this combined cleaning arrangement, simultaneously the gas can be aspirated from the ground region located above the ground water level, through the water free upper shaft region and outwardly to a gas filtering device located there.

When the ground water is strongly contaminated with volatile impurities, the arrangement can be designed so that in the cleaning region of the shaft insert the ground water is guided successively through two partial regions, and in each region air or another gas passes through it. As a result the ground water has a longer dwelling time and a correspondingly higher removal of the volatile impurities in the cleaning regions is obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
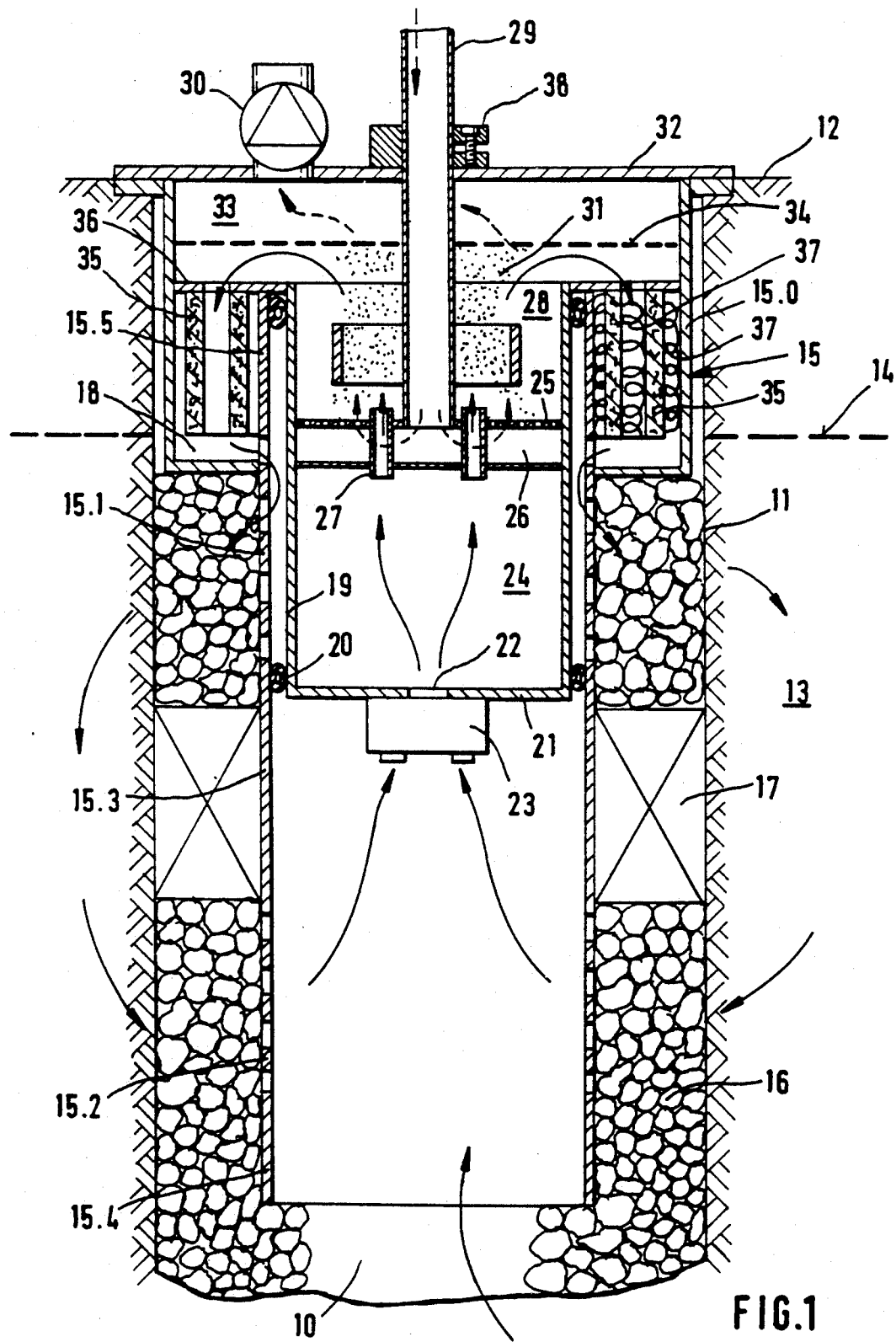
FIG. 1 is a view schematically showing a longitudinal section of a combined ground water cleaning device in accordance with a first embodiment of the invention.

An arrangement for cleaning contaminated ground water shown in FIG. 1 has a valve shaft which is identified as a whole with reference numeral 10 and has a circular cylindrical cross-section and a shaft wall 11. The shaft wall can be produced by a drilling tool and extends to a level 14 of a ground region 13 which is filled with contaminated ground water. A tubular shaft insert 15 is located in the shaft 10. The shaft insert 15 is completely filled in an upper tubular portion 15.0 of the shaft diameter, narrows downwardly to a smaller diameter and is subdivided into tubular portions 15.1 and 15.2 by water permeable wall and into tubular portions 15.3 and 15.4 by a water impermeable wall. The intermediate space between the tubular portions 15.1-15.4 and the shaft wall 11 is filled with gravel 16. The tubular region 15.3 located between the water permeable upper tubular portion 15.1 and the water impermeable lower tubular portion 15.2 is filled with a sealing mass 17 which counteracts a through-going vertical flow of water into the shaft intermediate space filled with the gravel. An additional tubular portion 15.5 with a water impermeable wall is located inside the shaft insert 15 and limits there a ring-shaped filter receiving chamber 18.

A hollow cylinder 19 is inserted in the shaft insert 15. It is held by inflatable sealing elements 20 on the shaft insert and sealed from the outside. The hollow cylinder 19 is closed at its lower end by a wall 21 provided with a central throughgoing opening 22. An electrically operating suction pump 23 is arranged near the opening 22. The wall 21 limits a water receiving chamber 24 in the hollow cylinder 19. The water receiving chamber extends upwardly to a nozzle body 26. The nozzle body is arranged in the hollow cylinder 19 and closed from the above by a wall 25 provided with nozzle openings. A plurality of axes-parallel throughgoing pipes 27 extend through the nozzle body 26 and lead to a cleaning region 28 of the shaft insert 15.

A pipe 29 extends in the nozzle body 26 from outside and concentrically to the hollow cylinder 19 to supply air into the nozzle body 26. Air rises under the action of suction of a fan 30 through the wall 25 provided with the nozzle openings and a cleaning region 28 of the shaft insert 15 filled with water upwardly as bubbles 31 shown by points and then aspirated outwardly by the fan 30. A negative pressure chamber 33 is formed by the fan 30 in the upper end region of the shaft insert 15 closed with a cover 32. A water level 35 of the shaft insert 15 which is located higher than the ground water level 14 in the ground region 13 is formed in the negative pressure chamber 33. The level height of this water level 34 is obtained by the feeding intensity of the suction pump 23 and partially by the pressure acting in the negative pressure chamber 33 and also depends on the discharge resistance of the water.

The flowing ground water is shown in the drawings by arrows with solid arrow lines and the following air is shown by arrows with broken arrow lines. It can be recognized from the arrows that the water which is supplied through the water receiving chamber 24 to the cleaning region 28 of the shaft insert 15 and penetrated by the arrow bubbles 31 is discharged through the filter receiving chamber 18 into the shaft insert 15 between the tubular portion 15.1, 15.5 and to the intermediate chamber 29 in the hollow cylinder 19, and then can flow back through the water permeable tubular portion 15.1 and the limited gravel filling in the shaft 10 into the ground region 13. The water aspiration region is limited by the lower tube opening and the water permeable tubular portion 15.2. The sealing mass 17 in the shaft 10 operates so that only ground water from the ground region in the water aspiration region of the shaft insert 15 can flow in.

The ring shaped filter receiving chamber 18 is filled in the shown embodiment with double casing filters 35. They are inserted loosely and suspended on collar wall 36 provided with inlet openings. The filter receiving chamber 18 can be filled with several double casing filter bodies arranged tightly on one another. They can be supported by filter walls identified by crosses, for example through spiral shaped reinforcing elements 37, or supported by the wall of the filter receiving chamber 18 as shown on the right side in FIG. 1.

The hollow cylinder 19 which is sealed by the inflatable sealing elements 20 relative to the shaft insert, together with the nozzle body 26 and suction pump 23 is fixedly connected with a pipe 21 for providing an air supply into the nozzle body 26. The pipe 29 extends outwardly through a central opening in the shaft cover 32. The hollow cylinder 19 can be displaced to a desired height on the pipe 29 inside the shaft insert 15, and then held in the respective position by a clamping ring 38. The clamping ring 38 lies on the shaft cover 32 and is clamped on the pipe 29.

Figure 2:
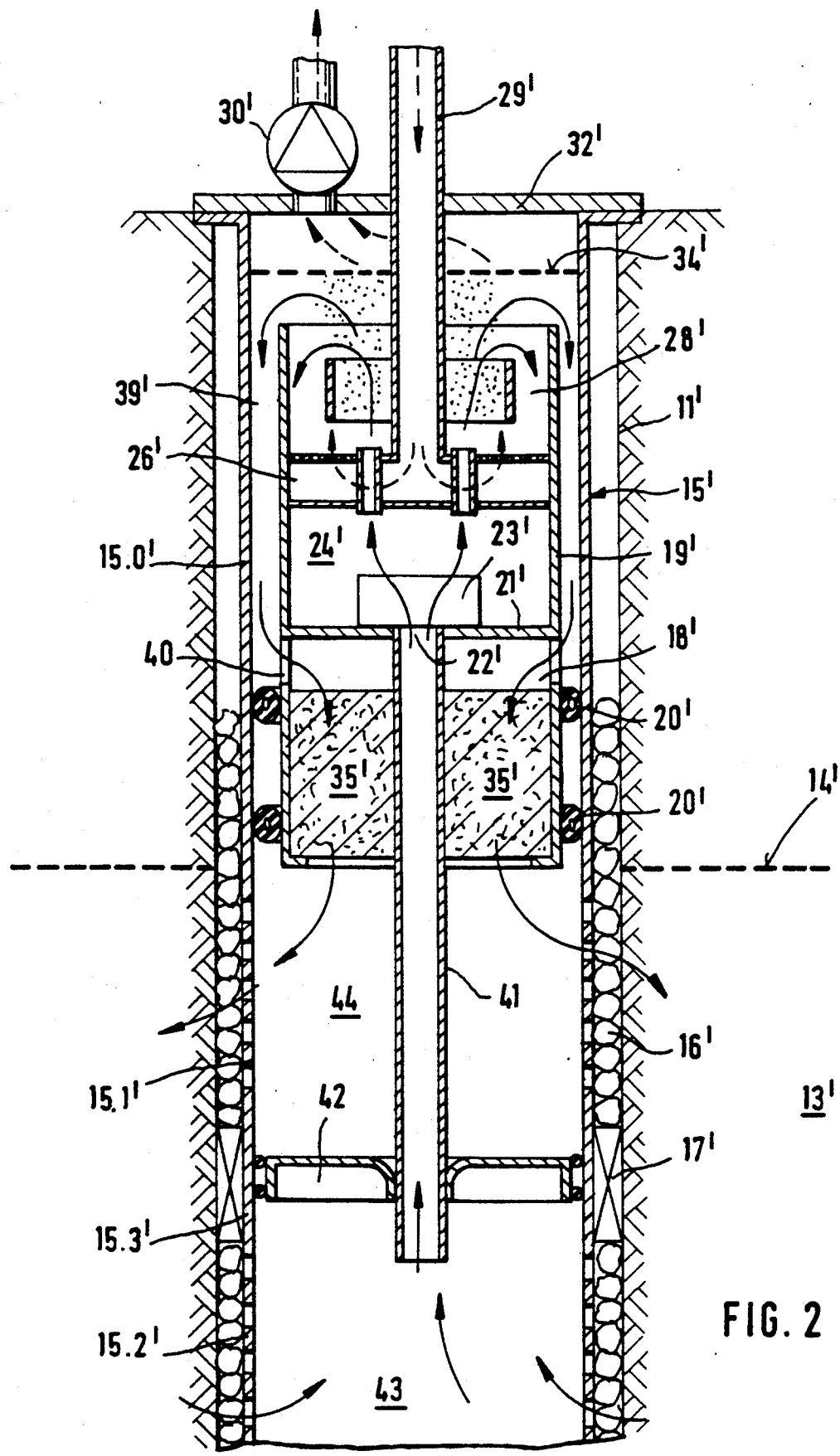
FIG. 2 is a view showing a central longitudinal section of the inventive arrangement in accordance with a second embodiment.

In the embodiment shown in FIG. 2 respective parts which correspond to the parts of the embodiment of FIG. 1 are identified with the same reference numerals with the addition of primes. The second embodiment differs from the first embodiment substantially in that the filter receiving chamber 18' is formed not radially outwardly but instead axially underneath the hollow cylinder 19' of the shaft insert 15'. The shaft insert 15' has a tubular body with the same diameter over its total length. It is also subdivided into a water impermeable upper tubular portion 15.0', a subsequent water permeable tubular portion 15.1', a water impermeable tubular portion 15.3' and a second water permeable tubular portion 15.2'. The intermediate space between the shaft wall 11' and the tubular shaft insert 15' is filled with a gravel filling 16' which however extends to the height of the tubular portion 15.3' through sealing element 17'.

The cleaning region 28' of the shaft insert 15' is formed similarly to the cleaning region of the first embodiment of FIG. 1. A filter pack 35' is arranged in the filter receiving chamber 18' which is downwardly connected with the wall 21' of the hollow cylinder 19'. The water flows downwardly from the cleaning region 28' through the intermediate chamber 39' located between the hollow cylinder 19' and the tubular portion 15.0' and through wall openings 40 into the interior of the filter receiving chamber 18'. A water aspiration pipe 41 extends through the filter receiving chamber 18' from the central water inlet opening 22' of the wall 21', downwardly to the region of the tubular portion 15.2'. At the height of the water impermeable tubular portion 15.3', a separating wall 42 is formed in the shaft insert 15' and a water aspiration pipe 41' extends through the separating wall. The separating wall 42 subdivided the shaft into a lower water aspiration region 43 and an upper water discharge region 44. The cleaned ground water reaches the water discharge region after passing the filter 35', and then flows through the water permeable tubular portion 15.1' outwardly back into the ground region 14'. The contaminated ground water flows through the water permeable tubular portion 15.2' into the water aspiration region 43 and from there, under the action of the aspiration pump 23' arranged in the water discharge chamber 24', through the water aspiration pipe 41 upwardly.

Figure 3:
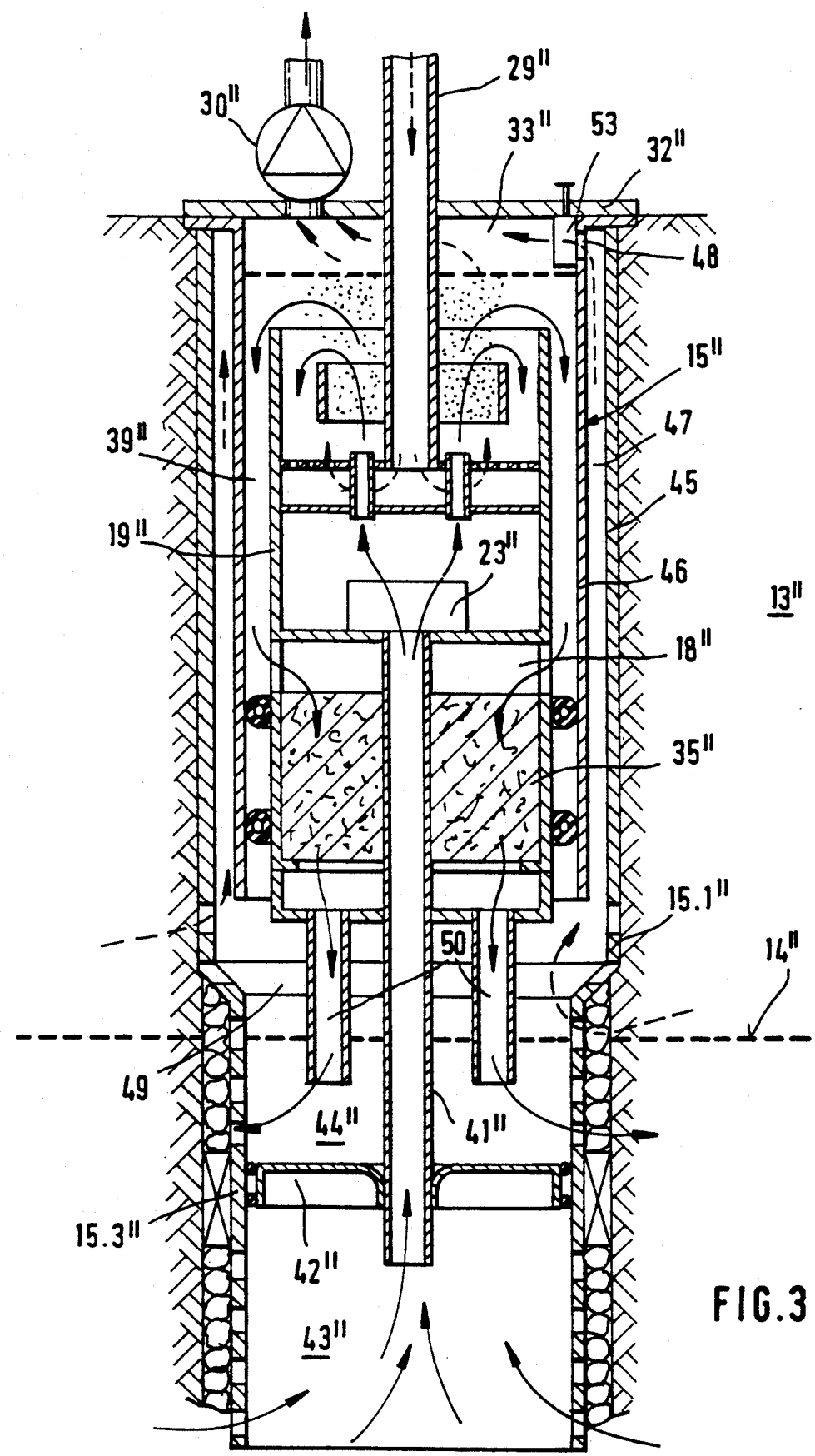
FIG. 3 is a view schematically showing a longitudinal section of the inventive arrangement in accordance with a third embodiment.

In the embodiment of FIG. 3 parts which correspond to the parts of the embodiment of FIG. 1 are identified with the same reference numerals with added double primes. The flow of the ground water in this arrangement is identified with arrows having solid arrow lines, and the flow of air and gas is identified with the arrows having broken arrow lines. In this embodiment the arrangement of the filter receiving chamber 18" and the filter 35" is similar to that of FIG. 2. However, this embodiment differs from the embodiments of FIGS. 1 and 2 in that in addition to the cleaning of the ground water, also a ground air aspiration from the ground region 13" located above the ground water level 14" is performed. For this purpose the shaft in its upper region is lined with an outer shaft pipe 45, and the shaft insert 15" starts inside it with a tubular casing 46 arranged at a distance. The annular gap 47 located between the outer shaft pipe 45 and the tubular casing 46 is connected above through openings 48 in the tubular casing 46 with the negative pressure chamber 33". It also extends downwardly to a gas collecting chamber 49 located above the ground water level 14". The gas collecting chamber 49 is formed at the height of a gas and water permeable tubular wall portion 15.1". The tubular wall portion 15.1" extends to the area below the ground water level 14" where a separating wall 42" is formed on the subsequent tubular portion 15.3". A water aspiration pipe 41" extends through the separating wall, which separates in the shaft the lower water aspiration region 43" and the upper water discharge region 44".

The water flows from the filter receiving chamber 18" through a falling pipe 50 into the water discharge region 44". In this part of the shaft insert 15" the water circulation is performed as in FIG. 2 through an intermediate chamber 39" formed between the tubular wall 46 and the hollow cylinder 19" of the shaft insert.

The hollow cylinder 19" with the filters, the falling pipe 50 and the water aspiration pipe 41 can be removed with the open shaft cover 32" on the air supply pipe 29" or adjusted to the desired vertical position in the shaft. In the shown adjusted vertical position, air or other gases can flow into the permeable tubular wall region 15.1" from the ground region in the gas collecting chamber 49, where the fan 30" builds a negative pressure. Thereby the air flows through the annular gap 47 and the openings 48 upwardly into the negative pressure chamber 33" and aspirated outwardly by the fan 30". There, an outer not shown air filtering device can be arrange. A throttle 53 which is adjustable from outside, can change the negative pressure in the intermediate chamber 47 or completely block the intermediate chamber 47.

Figure 4:
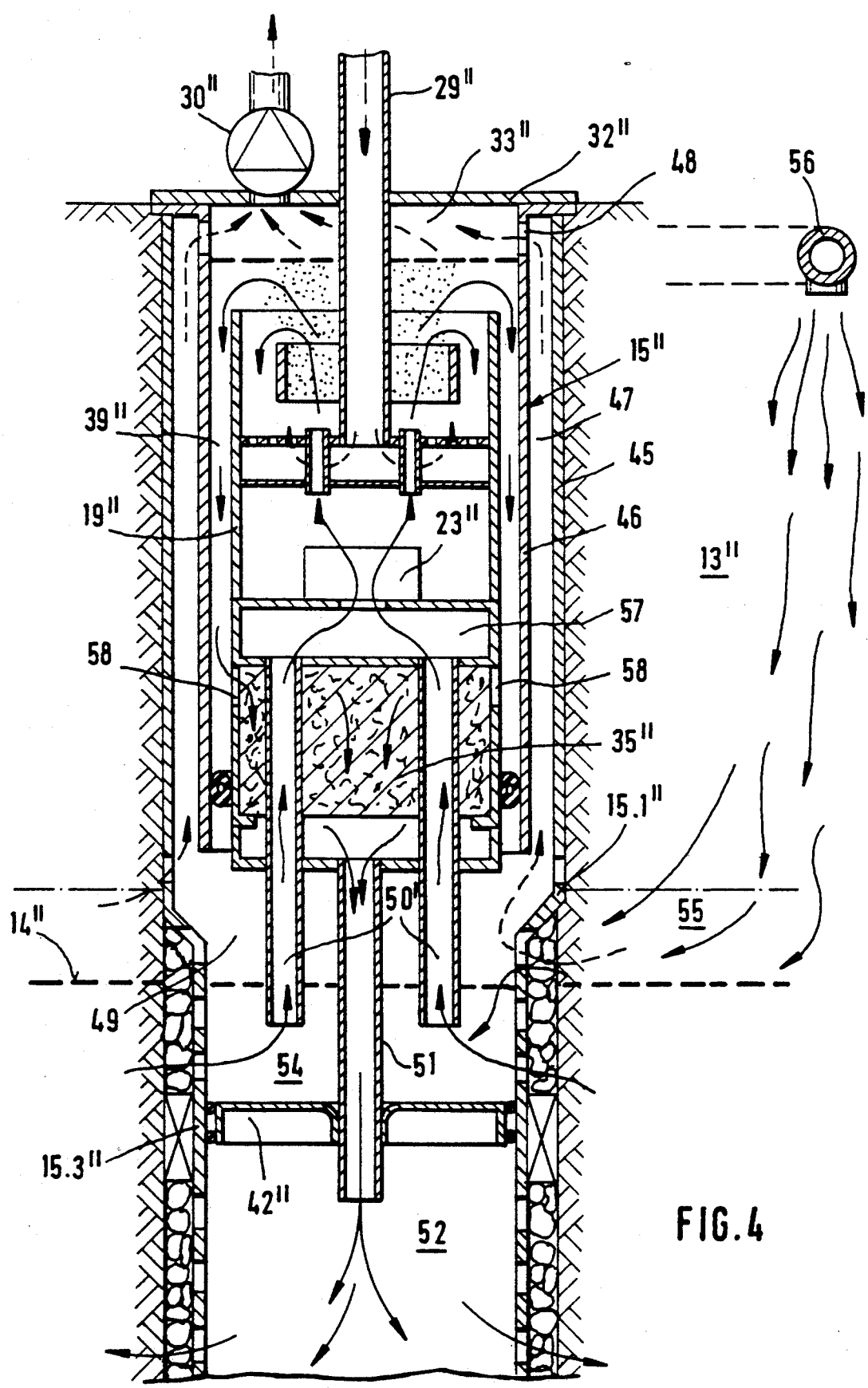
FIG. 4 is a view schematically showing a longitudinal section through a modification of a third embodiment of the inventive arrangement.

FIG. 4 shows a modification of the arrangement of FIG. 3. It is connected with a fresh water supply into the ground region. Due to the fresh water supply which is performed here from an annular conduit 56 located at a distance around the shaft, impurities can be flown outwardly from the capillary water region 55 located above the ground water level 14" without dragging the impurities into the ground water region located underneath. For this purpose the upper permeable tubular wall portion 15.1" extends up to the area above the ground water level 14" into the capillary water region 55. The water permeable tubular wall portion 15.1" limits a water aspiration region 54 of the shaft which is formed above the separating wall 42". In correspondence with this the lower part of the hollow cylinder 19" of the tubular insert 15" is changed as compared with the embodiment of FIG. 3. A pipe 51 extending through the separating wall 42" is a water return pipe. It extends from the lower hollow body region which contains a filter 35", into the water return region 52 of the shaft. The pipe 50' which extends from the water aspiration region 54 passes through the filter 35" upwardly into an aspiration chamber 57. The aspiration chamber is sealed from the filter chamber and provided for the suction pump 23". Water which flows back from the upper cleaning region 15" through the intermediate chamber 34" flows through several openings 58 of the wall of the hollow cylinder 19" into the filter chamber and passes through the filter 35" to the water return pipe 51.

It remains here with a retained capillary water raise in the capillary water region 55 by the fresh water supply from the annular conduit 56, and the impurities which flow out from the capillary water region 55 are aspirated at the height of this region into the shaft.

Figure 5:
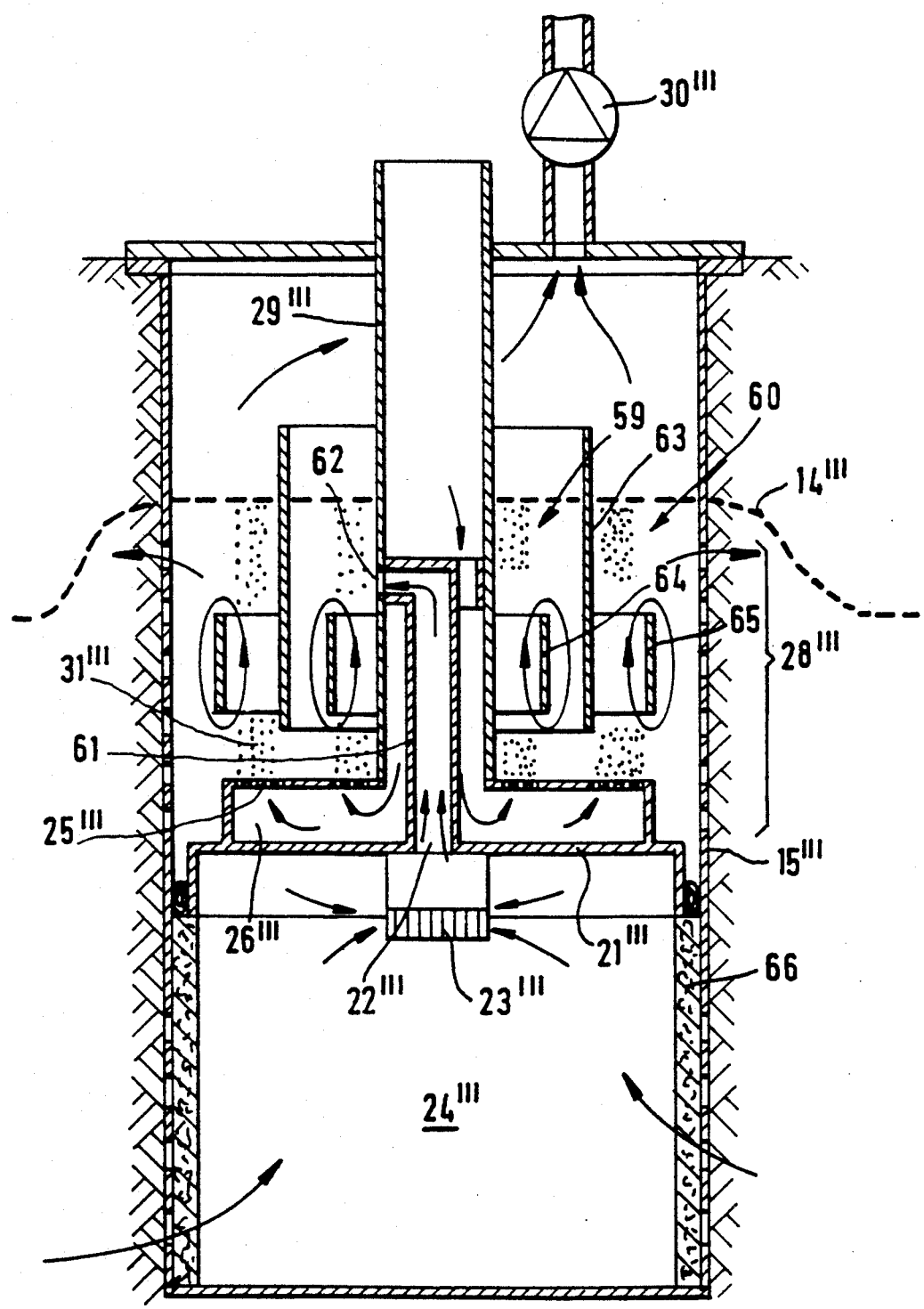
FIG. 5 is a view schematically showing a longitudinal section of the inventive arrangement in accordance with a fourth embodiment.

FIG. 5 shows an embodiment of the combined ground water-cleaning arrangement. Here in the cleaning region 28" of the arrangement the ground water is supplied successively in two partial regions 59 and 60 with the raising air or gas bubbles. This embodiment is especially advantageous in the event of very strongly contaminated ground water. The nozzle body 26''' is arranged in the shaft insert 15''' having the water permeable water region, and located on the transverse wall 21''' which subdivides the water receiving chamber of the shaft insert. The central throughout opening 2''' of the wall 21''', before which the suction pump 23''' is arranged, leads to a central tubular conduit 61'. The tubular conduit 61' partially extends concentrically in the pipe 29''' and ends in a lateral opening 62 of the pipe 29'''. A tubular wall which separates both partial regions 59 and 60 from one another is arranged above the nozzle body 26''' at a distance from its nozzle wall 25''' and at a distance from the pipe 29'''. An inner guiding ring 64 and an outer guiding ring 65 are arranged concentrically to the tubular wall. The tubular wall 63 extends outwardly to the ground water level 14''' formed in the shaft insert 15'''. The side opening 62 opens in the first partial region 59. The ground water which is supplied upwardly by the suction pump 23''' from the lower water receiving chamber 24''' limited laterally by a filter coating 66, flows in the first partial region 59 of the cleaning region 28'''. There a ground water circulating flow can be formed around the guiding ring 64 under the action of the air bubble 31''' raising through the partial region 59. The ground water flows subsequently through the intermediate chamber formed between the nozzle wall 25''' and a tubular wall 63, to the second outer partial region 60 of the cleaning region 28''''. There it can again form an annular flow around a guiding ring 65 under the action of the raising air bubbles 31'''. Finally, the ground water flows from the cleaning region 28''' through a perforated region of the outer wall of the shaft insert 15''' and outwardly.

As shown in FIG. 5, the nozzle openings in the nozzle wall 25''' are not uniform. They are distributed so that with respect to both guiding rings 64 and 65, the gas bubbles 31''' raise only at one side of these guiding rings. Thereby the unobjectionable annular flow of the ground water in both partial regions 59 and 60 around the guiding rings 64 and 65 is favored.

It will be understood that each of the elements described above, or two or more together, may also find a useful application in other types of constructions differing from the types described above.

While the invention has been illustrated and described as embodied in an arrangement for cleaning contaminated ground water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An arrangement for cleaning contaminated ground water and a ground region through which it flows, comprising a shaft extending to a region of the ground water to be cleaned and having upper and lower water permeable shaft walls separated from one another by a separating wall and sealing means across the diameter of the shaft a shaft insert means constructed and arranged to provide a flow path for aspirating of water from a ground region through one of said water permeable shaft walls, cleaning said ground water, and reintroducing the water into the ground region through the other of said water permeable shaft walls, wherein said shaft insert comprises said separating wall, a suction pump connected to a passage means extending through said separating wall to a water aspiration region of said shaft; a gas chamber above said passage through which a gas is supplied through a pipe leading to the oustide air; a water cleaning chamber which is connected to said passage above said gas chamber, and means for contacting air from said gas chamber with water in said cleaning chamber; means for circulating water from said cleaning chamber to a water recirculation region of said shaft; and means for supplying a negative pressure to a water free region of said shaft above an upper water level.

2. An arrangement as defined in claim 1; wherein said contact means comprises a nozzle wall which is located under a water level in the region of said shaft insert and forms the upper limit of said gas chamber.

3. An arrangement as defined in claim 2, wherein said shaft insert has an upwardly open downwardly extending hollow cylinder comprising a water receiving chamber above said passage means, said gas chamber being arranged inside said hollow cylinder above said water receiving chamber and said water cleaning chamber being formed in said hollow cylinder above said gas chamber and connected to said water receiving chamber by a plurality of pipes extending through said gas chamber and said nozzle wall.

4. An arrangement as defined in claim 3, wherein said suction pump is arranged in said hollow cylinder.

5. An arrangement as defined in claim 3; and further comprising a filter arranged in said circulation means for ground water cleaning, said shaft insert at least partially supporting said filter.

6. An arrangement as defined in claim 5, wherein said filter is arranged axially under said hollow cylinder of said shaft insert and is exchangeable.

7. An arrangement as defined in claim 5, wherein said filter is located radially outside of said hollow cylinder of said shaft insert and is exchangeable.

8. An arrangment as defined in claim 7; wherein said filter comprises flexible sieve walls supported relative to one another by at least one spiral-shaped reinforcing element.

9. An arrangement as defined in claim 3, wherein said shaft insert cylinder is located above a ground water level in said shaft; and wherein said passage comprises a pipe extending through said separating wall connecting said hollow cylinder with said water aspiration level of said shaft.

10. An arrangement as defined in claim 9, wherein said separating wall separates above it a water reintroducing region formed in said shaft and limited by one of said water permeable wall portions, said water reintroducing region extending upwardly to the area above a ground water level in said shaft into said water free region of said shaft which is held under a negative pressure.

11. An arrangement as defined in claim 9, wherein said water free region is connected to an annular negative presure chamber by at least one opening with a changeable throughgoing cross-section.

12. An arrangement as defined in claim 11; and further comprising a throttle arranged in said opening with changeable throughgoing cross-section.

13. An arrangement as defined in claim 3, wherein said said insert cylinder is arranged above a ground water level formed in said shaft; and wherein said circulation means comprises a pipe extending through said separating wall and connecting said hollow cylinder with said water reintroducing region of said shaft.

14. An arrangement as defined in claim 13, wherein said upper water permeable portion limits a water aspiration region in said shaft and extends to the area above a ground water level and into a capillary water region to which fresh water is supplied from above.

15. An arrangement as defined in claim 2, wherein said cleaning chamber is subdivided into at least two coaxial partial regions into which gas from said nozzle body is supplied, and the ground water flows through said partial regions successively.

16. An arrangement as defined in claim 15; and further comprising a downwardly and upwardly open tubular body which separates said partial regions from one another and arranged so that its lower end is spaced from said nozzle wall of said nozzle body, said partial regions having a radially outer partial region and a radially inner partial region connected by said tubular body.

17. An arrangement ad defined in claim 15; and further comprising a central tubular conduit connecting said passage means to an upper part of one of said partial regions.

18. An arrangement as defined in claim 15; and further comprising guiding rings arranged in each of said partial regions coaxially.

19. An arrangement as defined in claim 18, wherein said nozzle wall has a plurality of nozzle openings which are non-uniform and distributed so that gas bubbles rise at only one side of said guiding rings in each of said partial regions.

20. An arrangement as defined in claim 1, wherein said shaft insert is vertically adjustable in said shaft.

* * * * *